US011141665B2

(12) United States Patent
Duan et al.

(10) Patent No.: US 11,141,665 B2
(45) Date of Patent: Oct. 12, 2021

(54) METHOD OF DETERMINING EXCITING MOMENTS IN A GAME VIDEO AND METHOD OF PLAYING A GAME VIDEO

(71) Applicant: Shanghai Billbili Technology Co., Ltd., Shanghai (CN)

(72) Inventors: Shuangquan Duan, Shanghai (CN); Biao Yan, Shanghai (CN); Yi Zhang, Shanghai (CN); Xi Wen, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 0 days.

(21) Appl. No.: 17/018,351

(22) Filed: Sep. 11, 2020

(65) Prior Publication Data

US 2021/0077911 A1    Mar. 18, 2021

(30) Foreign Application Priority Data

Sep. 12, 2019 (CN) .................. 201910863090.X

(51) Int. Cl.
| | |
|---|---|
| *A63F 13/86* | (2014.01) |
| *A63F 13/67* | (2014.01) |
| *H04N 21/466* | (2011.01) |
| *H04N 21/472* | (2011.01) |
| *H04N 21/482* | (2011.01) |

(52) U.S. Cl.
CPC .............. *A63F 13/86* (2014.09); *A63F 13/67* (2014.09); *H04N 21/4667* (2013.01); *H04N 21/47217* (2013.01); *H04N 21/482* (2013.01)

(58) Field of Classification Search
CPC ........... H04N 21/482; H04N 21/47217; H04N 21/4667; A63F 13/67; A63F 13/86
See application file for complete search history.

(56) References Cited

U.S. PATENT DOCUMENTS

| 4,342,454 A * | 8/1982 | Baer ................... A63F 13/10 463/31 |
|---|---|---|
| 4,738,451 A * | 4/1988 | Logg ................... A63F 13/10 463/2 |
| RE35,314 E * | 8/1996 | Logg ................... A63F 13/10 463/2 |
| 5,779,548 A * | 7/1998 | Asai .................. A63F 13/497 463/31 |
| 6,699,127 B1 * | 3/2004 | Lobb ................... A63F 13/10 463/43 |
| 8,096,863 B2 * | 1/2012 | Annunziata ........... A63F 13/10 463/1 |
| 8,591,332 B1 * | 11/2013 | Bright .................. A63F 13/46 463/35 |

(Continued)

*Primary Examiner* — Reginald A Renwick
(74) *Attorney, Agent, or Firm* — BakerHostetler

(57) ABSTRACT

Techniques for determining exciting moments in a game video are described herein. The disclosed techniques comprise capturing a video frame in a target game video; obtaining an icon associated with a game character in the video frame; determining a corresponding health point of the game character in the video frame based on the icon; determining a health point change of the game character by comparing a plurality of health points of the game character in the plurality of video frames; and determining at least one exciting moment in the target game video based on the health point change.

20 Claims, 6 Drawing Sheets

(56) References Cited

U.S. PATENT DOCUMENTS

| | | | | |
|---|---|---|---|---|
| 8,727,867 | B2* | 5/2014 | Kane | G07F 17/3295 |
| | | | | 463/25 |
| 9,005,033 | B2* | 4/2015 | Figueroa | G07F 17/3295 |
| | | | | 463/43 |
| 9,573,062 | B1* | 2/2017 | Long | A63F 13/5255 |
| 2010/0277485 | A1* | 11/2010 | Zalewski | H04N 13/351 |
| | | | | 345/502 |
| 2016/0001183 | A1* | 1/2016 | Harvey | A63F 13/798 |
| | | | | 463/4 |
| 2016/0158656 | A1* | 6/2016 | Condrey | A63F 13/63 |
| | | | | 463/31 |
| 2017/0157512 | A1* | 6/2017 | Long | A63F 13/86 |
| 2017/0228600 | A1* | 8/2017 | Syed | G06K 9/325 |
| 2019/0118086 | A1* | 4/2019 | Gentile | A63F 13/25 |
| 2020/0078679 | A1* | 3/2020 | Dantas de Castro | A63F 13/67 |
| 2020/0251146 | A1* | 8/2020 | St. John Brislin | G11B 27/036 |
| 2020/0306638 | A1* | 10/2020 | Fear | G06N 3/08 |
| 2021/0046388 | A1* | 2/2021 | Schwarz | H04N 21/4781 |

* cited by examiner

METHOD OF DETERMINING EXCITING MOMENTS IN A GAME VIDEO AND METHOD OF PLAYING A GAME VIDEO

CROSS-REFERENCE TO RELATED APPLICATION

The present application claims priority of Chinese patent application filed on Sep. 12, 2019, with an application number 201910863090.X and a name "method of determining exciting moments in a game video and method of playing a game video". The entire content of the above-identified application is incorporated in the present application by reference.

BACKGROUND

With an improvement of network communication capabilities and terminal data processing capabilities, an experience of electronic games is becoming better and better, and more and more game enthusiasts are participating in and watching a game competition. Among them, for an audience watching videos of the game competition, more attention is paid to exciting moments in the game competition.

SUMMARY

The object of the present invention is to provide a method of determining exciting moments in a game video, a method of playing a game video, a computing device, and a computer readable storage medium, in order to solve a technical problem in the prior art that manpower and time consumption is large and time efficiency is low when determining the exciting moments in the game video.

In order to achieve the above object, the present invention provides a method of determining exciting moments in a game video.

The method of determining exciting moments in the game video comprising: capturing video frames in a target game video; obtaining an icon identifying a health point of a game character in the video frames; recognizing the health point identified by the icon; determining a health point change of the game character by comparing the health point identified by the icon in a plurality of video frames; and determining exciting moments in the target game video according to the health point change.

Further, wherein after the step of capturing video frames in a target game video, and before the step of obtaining an icon identifying a health point of a game character in the video frames, the method further comprises: determining whether the video frames is an in-game scene image; wherein, when the video frames is an in-game scene image, executing the step of obtaining an icon identifying a health point of a game character in the video frames.

Further, wherein the exciting moments comprise the video frames with the icon with zero health point.

Further, the step of determining the exciting moments in the target game video according to the health point change comprises: determining a first video frame, wherein the first video frame has an icon with the health point of a first game character within a first preset health point range; determining a second video frame, wherein the second video frame is located behind the first video frame, and the second video frame has an icon with the health point of the first game character with zero health point; and determining the exciting moments comprising a plurality of video frames from the first video frame to the second video frame.

Further, the step of determining the exciting moments in the target game video according to the health point change comprises: determining a third video frame, wherein, the third video frame has an icon with the health point of a second game character within a second preset health point range and an icon with the health point of a third game character with non-zero health point, and the second game character and the third game character belongs to different teams in a game; determining a fourth video frame, wherein, the fourth video frame is located behind the third video frame, a time difference between the fourth video frame and the third video frame is less than a first preset time, and the fourth video frame has an icon with the health point of the third game character with zero health point; and determining the exciting moments comprising a plurality of video frames from the third video frame to the fourth video frame.

Further, the step of determining the exciting moments in the target game video according to the health point change comprises: determining a fifth video frame, wherein, the fifth video frame has an icon with the health point of both a fourth game character and a fifth game character with non-zero health point, and the fourth game character and the fifth game character are different characters; determining a sixth video frame, wherein, the sixth video frame has an icon with the health point of the fourth game character with zero health point; determining a seventh video frame, wherein, the sixth video frame has an icon with the health point of the fifth game character with zero health point, a time difference between the fifth video frame and the sixth video frame is less than a second preset time, and the seventh video frame and the sixth video frame are the same video frame or the seventh video frame is located between the fifth video frame and the sixth video frame; and determining the exciting moments comprising a plurality of video frames from the fifth video frame to the sixth video frame.

Further, the step of obtaining an icon identifying a health point of a game character in the video frame comprises: obtaining pixels at a preset position in the video frame to obtain the icon.

Further, the step of obtaining an icon identifying a health point of a game character in the video frame further comprises: obtaining pixels forming a preset outline in the video frame to obtain the icon.

In order to achieve the above object, the present invention provides a method of playing a game video.

The method of playing the game video comprising: determining exciting moments in a target game video according to any method provided by the present invention to determine the exciting moments in the game video: when playing the target game video, displaying an entrance control to enter the exciting moments on a playing interface; and in response to a user's operation on the entrance control, skipping a current playing progress to the exciting moments to play.

In order to achieve the above object, the present invention also provides a computing device, which comprises a memory, a processor, and computer programs that stored in the memory and operable on the processor, wherein the processor executes the computer programs for implementing the steps of method described above.

In order to achieve the above object, the present invention also provides a computer-readable storage medium, which stores computer programs that upon execution by a processor cause the processor to implement the steps of method described above.

DETAILED DESCRIPTION OF ILLUSTRATIVE EMBODIMENTS

Figure 1:
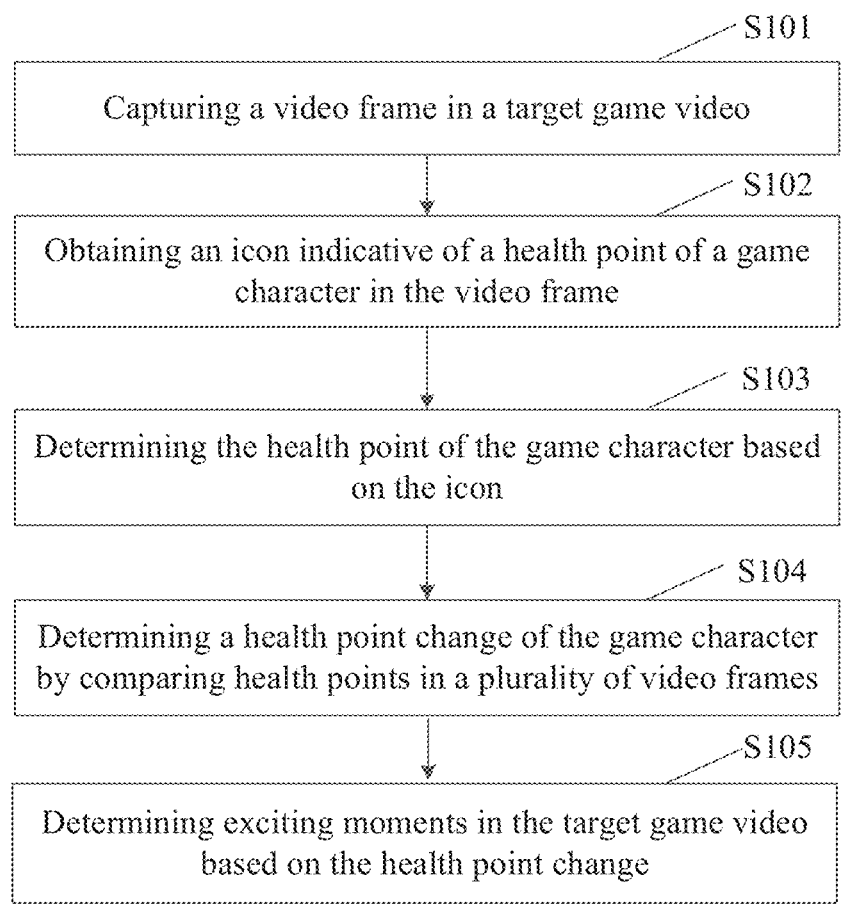
FIG. 1 illustrates a schematic flowchart of a method of determining exciting moments in a game video provided by Embodiment 1 of the present invention.

In the game competition, exciting moments is usually focused on a moment of a killing moment and a few seconds before and after. In the prior art, in order to improve user's viewing experience and reduce user's manual operations of repeatedly dragging a video progress bar to find the exciting moments of the game competition, after a recording of the game video is completed, manual manipulation and manual editing will be carried out to determine the exciting moments in the game video. However, the method not only consumes a lot of manpower and time, but also has low efficiency.

Therefore, providing a method of determining exciting moments in the game video and a method of playing the game video in order to improve a timeliness of determining the exciting moments in the game video, and reduce a consumption of manpower and time have become an urgent technical problem in the field. Through the present invention, a timeliness of determining the exciting moments in the game video is improved, and a consumption of manpower and time is reduced.

In order to make objectives, technical solutions and advantages of the present invention more clear, the present invention will be further described in detail below in conjunction with accompanying drawings and embodiments. It should be understood that the specific embodiments described herein are only used to explain the present invention and are not intended to limit the present invention. Based on the embodiments of the present invention, all other embodiments obtained by those of ordinary skilled in the art without making creative efforts fall within the protection scope of the present invention.

The present invention provides a method and a device of determining exciting moments in a game video, a method and a device of playing a game video, a computing device and a computer-readable storage medium. The present invention is directed to a specific type of game video. In the type of game video, there is an icon that identifies a health point of a game character. For the type of game video, in the method of determining the exciting moments in the game video provided by the present invention, first, the game video to be processed and a target game video are parsed, video frames are captured, and then the video frames are processed to obtain the icon identifying the health point of the game character in the video frames and recognize the icon to obtain the health point identified by the icon, and a health point change of the game character is determined by comparing the health point identified by the icon in a plurality of video frame, finally, the exciting moments in the target game video is determined according to the health point change, wherein, the health point change includes situations that the health point is greatly reduced in a short time, and the health point change is zero and so on. Because a change of the health point identified by the icon directly reflects the situation that the game character corresponding to the icon is attacked, therefore the exciting moments when the game character was attacked is able to be determined according to the health point change. In summary, in the present invention, a moment when the game character is attacked, that is, the exciting moments of the game video, can be obtained by analyzing the change of the health point in a video, which can quickly and accurately determine the exciting moments in the game video, improve a timeliness of determining the exciting moments in the game video, and reduce a consumption of manpower and time.

The specific embodiments of a method and a device of determining the exciting moments in the game video, the method and a device of playing the game video, a computing device and a computer-readable storage medium provided by the present invention will be described in detail below.

Embodiment 1

Embodiment 1 of the present invention provides a method of determining exciting moments in a game video, the method can be applied to but not limited to one of the following usage scenarios: in a system of determining the exciting moments in the game video, the system includes a client (or a front end) and a server. The client provides an interface to receive a target game video. A user can upload a pending game video through the client, and the client sends the target game video received to the server. The server uses the method of determining the exciting moments in the game video provided in the embodiment to process the target game video to determine the exciting moments in the game video, further, the server returns a relevant result of the determined exciting moments to the client, and displays the relevant result through the client. Specifically, for example, after the client of a video website receives the target game video uploaded by user A, a data processing server in the background of the website uses the method of determining the exciting moments in the game video provided by the embodiment to determine the exciting moments in the game video, on one hand, user A can preview the game video with the exciting moments through the client, and can also preview a collection of all exciting moments in the game video through the client: on the other hand, when playing the game video through the client, user B can select a playing mode that identifies the exciting moments, in the playing mode, user B can select the part of the exciting moments for independently playing.

Specifically, FIG. 1 illustrates a schematic flowchart of a method of determining exciting moments in a game video provided by Embodiment 1 of the present invention.

As shown in FIG. 1, the method of determining the exciting moments in the game video provided in the embodiment includes the following steps S101 to S105.

Step S101, capturing video frames in a target game video.

In the embodiment, when processing the target game video, first the target game video is parsed through the step S101 to capture the video frame. Optionally, during parsing, the target game video is traversed in chronological order, and is captured at a certain interval. Optionally, a plurality of video frames may be captured, and then each of the video frames is processed in the following steps, or after one video frame is intercepted and processed in the following steps, and then a next video frame is captured. Optionally, a target game video line is also divided into a plurality of video segments, and a plurality of threads are started, and each of the threads simultaneously captures the video frame for different video segments.

Step S102, obtaining an icon identifying a health point of a game character in the video frames.

Figure 2:
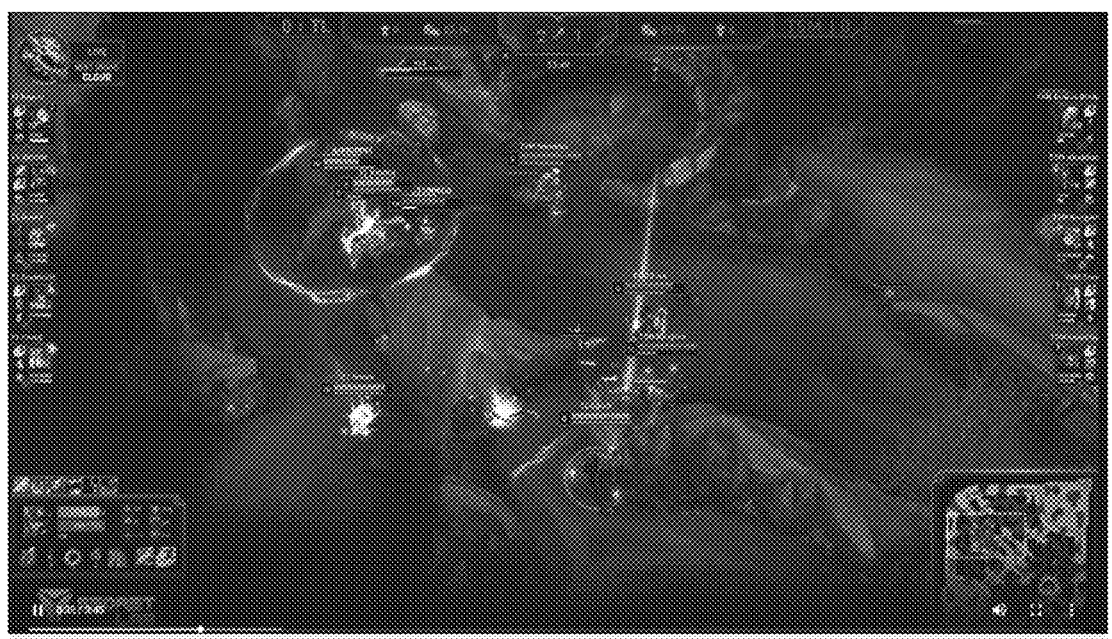
FIG. 2 illustrates a schematic diagram of a video frame provided by an embodiment of the present invention.

In a game, the health point is used to represent survival status of the game character. When the health point of the game character is non-zero, the game character is in a living state, and the greater the health point, the greater the ability to withstand attacks; when the health point of the game character is zero, the game character is in a dead state, unable to use skills. In the game video, the health point of the game character is identified using the icon. For example, the icon can be composed of an arbitrary shape outline and a fill color within the outline, wherein, amount of a filled part indicates the amount of the health point, specifically, the icon with outline completely filled identifies that the game character has full blood, the icon with outline partially filled identifies that the game character has lost blood, and the icon with no filler in the outline identifies that the game character has lost all blood, that is, the game character is dead. A specific shape of the outline of the icon may be circular, rectangular, or other shapes, which is not limited in the present application. FIG. 2 is a schematic diagram of a video frame provided by an embodiment of the present invention. In an embodiment, as shown in FIG. 2, in the video frame, the icon identifying the health point of the game character is a rectangular icon which can be filled, and the longer the length of a filled portion, the greater the health point. Or, in another embodiment, the icon identifying the health point of the game character is a circular icon which can be filled, and the larger an area of the filled portion, the greater the health point. As another example, the icon includes several sub-graphics, and the number of the sub-graphics identifies the amount of health point of the game character.

In addition, in the video frame, at a position where the icon is displayed, identification information of the game character is also displayed, such as a name of the character or account information of a player and so on. After obtaining the icon, the identification information corresponding to the icon is recognized at the same time, and the relationship between the icon and the game character can be determined.

When obtaining the icon that identifies the health point of the game character in the video frame, following methods can be used:

The first way, is obtaining pixels at a preset position in the video frame to obtain the icon.

The second way, is obtaining pixels forming a preset outline in the video frame to obtain the icon.

For some game videos, the icon identifying the health point is displayed at a fixed position in a video frame image. As shown in FIG. 2, an icon column is respectively set on the left and right sides of the video frame image, and each icon column includes a plurality of icons set at one time, used to identify the health point of different game characters in a team. For the type of game video, the above-mentioned first way may be used, that is, obtaining pixels at a preset position in the video frame to obtain the icon. The preset position is the fixed position to set the icon. Specifically, a square area including the icon is obtained, after the square area including the icon is obtained, and image recognition and processing are performed to obtain the icon. For example, within the square area, an icon outline is further extracted to obtain the icon, or, within the square area, the sub-graphic is further extracted to obtain the icon. In this way, the pixels at the fixed position in the video frame can be directly obtained for processing, and the obtaining method is relatively simple.

For some game videos, the icon identifying the health point is displayed around the game character in the video frame image, and the icon follows a movement of the game character. As shown in FIG. 2, above each of the game character in the middle of the video frame image, an icon with the same outline is set. For the type of game video, the above-mentioned second way may be used, that is, obtaining pixels forming the preset outline in the video frame to obtain the icon. Specifically, the icon is obtained when pixels forming the preset outline are obtained in the video frame. The position of the icon in the video frame is not limited in this way.

Step S103, recognizing the health point identified by the icon.

Optionally, when recognizing the health point identified by the icon, for the icon with a specific outline and filled in the outline, a specific grayscale pixel within the icon outline can be extracted. Taking a single pixel as the unit of health point, the number of pixels represents the size of the health point, or the size of an area occupied by a specific pixel within the outline of the icon represents the size of the health point. For the icon including several sub-graphics, the number of the sub-graphics included in the icon can be calculated, and taking the sub-graphics as the unit of health point, the number of sub-graphics represents the size of the health point.

Step S104, determining a health point change of the game character by comparing the health point identified by the icon in a plurality of video frames.

Optionally, after recognizing the health point identified by the icon in each video frame, a health point record is written and compared with a historical health point record, and the health point change of the game character can be obtained, including a gradual decrease of the health point, a rapid decrease of the health point, the health point reducing to be zero, the health point changing from zero to full blood and so on.

Usually, the exciting moments in the game video, that is, the moment when the game character is attacked, may occur more intensively in a shorter period of time, or may not occur within a certain period of time. Based on this, optionally, when the video frames are captured in the target game video, the video frames can be captured at a longer interval for analysis. When the analysis shows that the health point reflected by two adjacent video frames changes greatly, the time interval of capturing video frames can be shortened Step S105, determining the exciting moments in the target game video according to the health point change.

As noted above, the health point change includes a variety of changes. According to different game logics, the game character reflected by the health point change is also different. In an embodiment, when the game character is intensively attacked, the health point will decrease rapidly. Therefore, if the part where the game character is intensively attacked is taken as the exciting moments in the target game video, when step S104 determines that the health point of the game character decreases rapidly by comparing the health point identified by the icon in a plurality of video frames, a scene in which the game character is intensively attacked occurs in the plurality of video frames, that is, the plurality of video frames may constitute the exciting moments in the target game video. In another embodiment, when the game character is attacked to die, the health point will be reduced from non-zero to zero. Therefore, if the part of the game character attacked to die is taken as the exciting moments in the target game video, when step S104 determines that the health point of the game character is reduced from non-zero to zero by comparing the health point identified by the icon in the plurality of video frames, the scene in which the game character is attacked to die occurs in the plurality of video frames, that is, the plurality of video frames may constitute the exciting moments in the target game video, that is to say, a continuous content between frames whose health point changes rapidly constitutes the exciting moments in a video.

Depending on different game, the exciting moments in the game video can be different, and types of health point change reflecting the exciting moments are different. Therefore, according to the types of health point change reflecting the exciting moments, a corresponding relationship between the exciting moments and the types of health point change is established. After determining the health point change, the exciting moments in the target game video can be determined according to the corresponding relationship.

Using the method of determining the exciting moments in the game video provided in the embodiment, the target game video is parsed to capture the video frames, and then the icon identifying the health point of the game character is obtained in the video frames, the size of the health point is recognized, and a health point change of the game character is determined by comparing the health point identified by the icon in a plurality of video frames, finally, the exciting moments in the target game video is determined according to the health point change, the method can quickly and accurately determine the exciting moments in the game video, does not need to find the exciting moments artificially, improve a timeliness of determining the exciting moments in the game video, and reduce a consumption of manpower and time.

Optionally, in an embodiment, after the step of capturing a video frame in a target game video, and before the step of obtaining an icon identifying a health point of a game character in the video frame, the method for determining the exciting moments in the game video further includes: determining whether the video frame is an in-game scene image. Wherein, when the video frame is an in-game scene image, executing the step of obtaining an icon identifying a health point of a game character in the video frame.

Specifically, after capturing a video frame, first judging whether the video frame is the in-game scene image, then when the video frame is the in-game scene image, the icon identifying the health point of the game character is obtained in the video frame. In the video frame, especially in a game competition recording video, the in-game scene image has the icon, while a non-in-game scene image such as a commentary lens and an advertising lens usually does not have the icon. Therefore, using the method of determining the exciting moments in the game video provided in the embodiment, before obtaining the icon, first determining whether the video frame is the in-game scene image, and then obtaining the icon to avoid performing meaningless data processing steps of obtaining the icon for the non-in-game scene image. Wherein, when determining whether the video frame is the in-game scene image, the determination can be performed according to an inherent characteristic of the in-game scene image, for example, the in-game scene image includes a specific game background, a scoreboard, or a game logo and so on, determining whether the video frame is the in-game scene image by identifying whether the video frame has the above-mentioned inherent characteristic. Further optionally, a plurality of video frames may be spaced apart to perform the step of determining whether the video frame is the image of a scene in a game, for example, a determination is performed every 5 video frames.

Optionally, in an embodiment, the exciting moments includes the video frames with the icon with zero health point.

Specifically, in a video frame, there is an icon identifying a zero health point, that is, the video frame belongs to a lens where the game character corresponding to the icon is attacked to die. The exciting moments is set to include the video frame with the icon with zero health point, that is, the lens where the game character is attacked to die is able to be extracted in the exciting moments.

For a situation where the exciting moments include the video frame with the icon with zero health point, further, the exciting moments may be determined by the following ways.

In a first embodiment, the health point change includes the health point of a first game character changes from the health point in a first preset health point range to zero, and the step of determining the exciting moments in the target game video according to the health point change includes: determining a first video frame, wherein the first video frame has an icon with the health point of the first game character within the first preset health point range; determining a second video frame, wherein the second video frame is located behind the first video frame, and the second video frame has an icon with the health point of the first game character with zero health point; and determining the exciting moments including a plurality of video frames from the first video frame to the second video frame.

Specifically, for the exciting moments that include the game character is attacked from verge of death to death, determining the health point change of the game character by comparing the health point identified by the icons in a plurality of video frames includes: the health point of the first game character changes from the health point in the first preset health point range to zero, at the moment, when determining the exciting moments in the target game video, first, the first video frame is determined, wherein the health point of the first game character identified by the icon in the first video frame is within the first preset health point range, and then the second video frame is determined behind the first video frame, wherein the health point of the first game character identified by the icon in the second video frame is zero. Then, the exciting moments are determined including a plurality of video frames from the first video frame to the second video frame, wherein the first preset health point range may be selected from 10 percent to 5 percent of the health point. It should be noted that, in the present invention, "First" and "Second" in the first game character, the first video frame and the second video frame in the above, and the second game character, the first preset time, the second preset time in the following and other words are only used to achieve a logical distinction, and do not constitute a limitation in order.

Further, in an embodiment, each video frame is captured in the target game video, the step of obtaining the icon identifying the health point of the game character in the video frame and the health point identified by the identifying icon is performed, thereby after determining the first video frame, a video frame with an icon with zero health point first determined after the first video frame is the second video frame, in another embodiment, first, a plurality of video frames are captured in the target game video, and then for each of the captured video frames, the step of obtaining the icon identifying the health point of the game character in the video frame and the health point identified by the identifying icon is performed, when the health point of the first game character identified by the icon in the plurality of consecutive video frames obtained is within the first preset health point range, any one video frame of the plurality of consecutive video frames is selected as the first video frame, or the video frame with the smallest health point is selected as the first video frame; when the health point of the first game character identified by the icon in the plurality of consecutive video frames obtained is zero, any one video frame of the plurality of consecutive video frames is selected as the second video frame, or the video frame closest to the first video frame is selected as the second video frame.

In a second embodiment, the health point change includes that the health point of a second game character is within a second preset health point range and the health point of a third game character changes from non-zero to zero, the second game character and the third game character belong to different teams in a game. Taking the game named League of Legends (LoL) as an example, the health point of different teams belongs to left and right sides of the video frame, and the step of determining the exciting moments in the target game video according to the health point change includes: determining a third video frame, wherein, the third video frame has the icon with the health point of the second game character within a second preset health point range and the icon with the health point of the third game character with non-zero health point; determining a fourth video frame, wherein, the fourth video frame is located behind the third video frame, a time difference between the fourth video frame and the third video frame is less than a first preset time, and the fourth video frame has the icon with the health point of the third game character with zero health point: and determining the exciting moments comprising a plurality of video frames from the third video frame to the fourth video frame.

Specifically, for the exciting moments that includes a game counterattack scene, determining the health point change of the game character by comparing the health point identified by the icon in the plurality of video frames includes: within the first preset time, in two teams, the health point of the second game character of one team is within the second preset health point range, and the health point of the third game character of the other team changes from non-zero to zero. At the moment, when determining the exciting moments in the target game video, first, the third video frame is determined, the health point of the second game character identified by an icon in the third video frame is within the second preset health point range, the health point of the third game character identified by another icon in the third video frame is non-zero, and then the fourth video frame is determined among the video frames whose distance does not exceed the first preset time after the third video frame, and the health point of the third game character identified by the icon in the fourth video frame is zero. Then, determining the exciting moments comprising a plurality of video frames from the third video frame to the fourth video frame, wherein the second preset health point range may be selected from 3 percent to 5 percent of the health point, and the first preset time may be 3 seconds.

Wherein, when the health point of the second game character identified by the icon in the plurality of consecutive video frames obtained is within the second preset health point range, the health point of the third game character identified by another icon is non-zero, any one video frame of the plurality of consecutive video frames is selected as the third video frame, or the video frame with the smallest health point is selected as the third video frame; when the health point of the third game character identified by the icon in the plurality of consecutive video frames obtained among the video frames whose distance does not exceed the first preset time after the third video frame is zero, any one video frame of the plurality of continuous video frames is selected as the fourth video frame, or the video frame closest to the third video frame is selected as the fourth video frame.

In a third embodiment, the health point change includes: within a second preset time, both the health point of a fourth game character and a fifth game character change from non-zero to zero, and the fourth game character and the fifth game character are different roles. The step of determining the exciting moments in the target game video according to the health point change includes: determining a fifth video frame, wherein, the fifth video frame has an icon with the health point of both the fourth game character and the fifth game character with non-zero health point; determining a sixth video frame, wherein, the sixth video frame has an icon with the health point of the fourth game character with zero health point; determining a seventh video frame, wherein, the seventh video frame has an icon with the health point of the fifth game character with zero health point, the time difference between the fifth video frame and the sixth video frame is less than a second preset time, and the seventh video frame and the sixth video frame are the same video frame or are located between the fifth video frame and the sixth video frame; and determining the exciting moments comprising a plurality of video frames from the fifth video frame to the sixth video frame.

Specifically, for the exciting moments that includes a game character team killing, determining the health point change of the game character by comparing the health point identified by the icon in the plurality of video frames includes: within the second preset time, the health point of both the fourth game character and the fifth game character change from non-zero to zero. At the moment, when determining the exciting moments in the target game video, first, the fifth video frame is determined, the health point of the fourth game character identified by the icon in the fifth video frame is non-zero, the health point of the fifth game character identified by another icon in the fifth video frame is also non-zero, and then the sixth video frame and the seventh video frame are determined among the video frames whose distance does not exceed the second preset time after the fifth video frame. In one case, the sixth video frame and the seventh video frame are the same video frame, in the video frame, the health point of the fourth game character identified by the icon is zero, the health point of the fifth game character identified by another icon is also zero. In another case, the sixth video frame and the seventh video frame are different video frames, the health point of the fourth game character identified by the icon in the sixth video frame is zero and the health point of the fifth game character identified by another icon in the seventh video frame is also zero. Then, determining the exciting moments comprising a plurality of video frames from the fifth video frame to the sixth video frame, wherein the second preset time may be 5 seconds.

Optionally, taking the second preset time as a time window and using a single video frame as a moving step, the video frame in each of the time window is judged to determine the fifth video frame, the sixth video frame, and the seventh video frame.

Optionally, in another embodiment, the exciting moments includes a plurality of video frames in which the health point change of the game character is greater than a preset health point within a third preset time.

Specifically, when the health point change reflected in the plurality of video frames correspond to the rapid blood loss of the game characters, that is, the health point change value is large in a shorter time, and is greater than the preset health point, that is, the plurality of video frames belong to the scenes where the game character corresponding to the icon was intensively attacked. The exciting moments is set including the above-mentioned the plurality of video frames, that is, the lens where the game character is intensively attacked can be extracted in the exciting moments.

Embodiment 2

Embodiment 2 of the present invention provides a method of playing a game video, which can be applied to, but not limited to, a usage scenario as follows: in a video website, a special playing mode identifying exciting moments in a game video and a general mode not identifying the exciting moments in the game video are provided. When a user uses the special playing mode to play the game video at front end of the video website, the user can operate an entrance control for the exciting moments on a front end playing interface, and then the front end can skip to the exciting moments to play through a back-end server processing, wherein the exciting moments of the game video can be determined by using the method of determining the exciting moments in the game video provided by any one of the foregoing embodiments.

Figure 3:
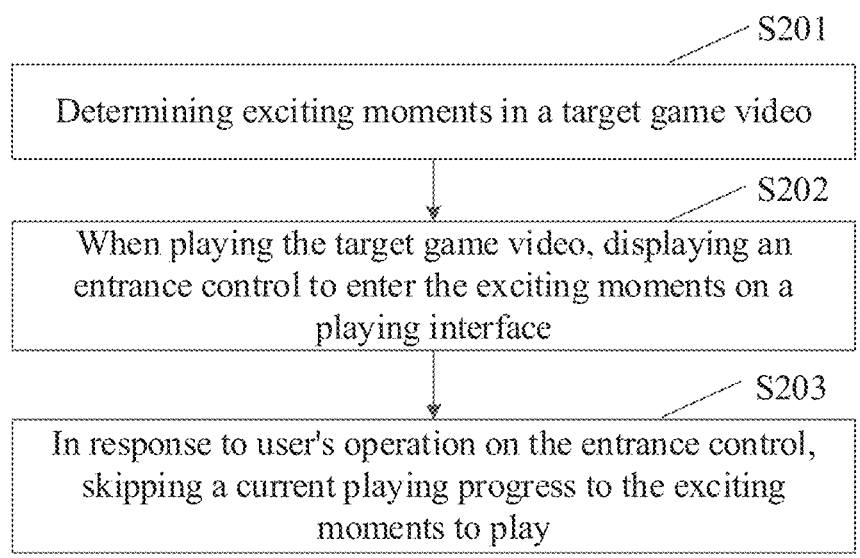
FIG. 3 illustrates a schematic flowchart of a method of playing a game video provided by Embodiment 2 of the present invention.

Specifically, FIG. 3 illustrates a schematic flowchart of a method of playing a game video provided by Embodiment 2 of the present invention, as shown in FIG. 3, the method of playing a game video provided in the embodiment includes the following steps S201 to S203:

Step S201, determining exciting moments in a target game video.

Specifically, any method of determining the exciting moments in the game video provided by the present application may be adopted to determine the exciting moments in the target game video, which will not be repeated here. For details, reference may be made to the relevant description in the above.

Wherein, a plurality of exciting moments in the target game video can be determined.

Step S202, when playing the target game video, displaying the entrance control to enter the exciting moments on the playing interface.

Specifically, on the playing interface, not only a video is played normally, but also the entrance control to enter the exciting moments is displayed, for example, below a regular playing image, a reduced image of a video frame in the exciting moments is displayed. Meanwhile, characteristics of the exciting moments can also be identified on the reduced image, for example, duration of the exciting moments, a start time of the exciting moments, and/or the number of character deaths occurred in the exciting moments and so on.

When the target game video includes a plurality of exciting moments, the entrance control may be displayed for each of the exciting moments on the playing interface, or all exciting moments are collected to form an exciting moments collection.

Step S203, in response to user's operation on the entrance control, skipping a current playing progress to the exciting moments to play.

Optionally, when the user clicks on the entrance control, the current playing progress is directly skipped to the start time of the exciting moments to play, and is automatically played to an end time of the exciting moments and finished. Further, after the end time, a next exciting moments can be automatically entered to play.

Using the method of playing the game video provided in the present invention, the exciting moments in the game video can be quickly determined when playing the game video, so that when playing the game video, a user can directly skip to the exciting moments to play according to a requirement, improving a timeliness of determining the exciting moments in the game video, reducing a consumption of manpower and time and improving the user's viewing experience.

Embodiment 3

Figure 4:
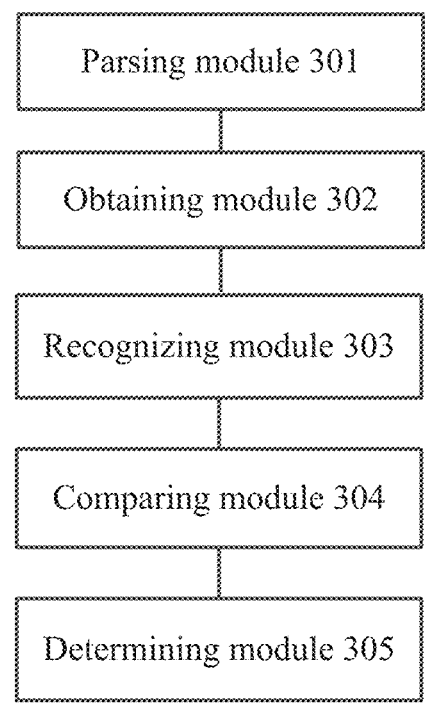
FIG. 4 illustrates a block diagram of a device of determining exciting moments in a game video provided by Embodiment 3 of the present invention.

Embodiment 3 of the present invention provides a device of determining exciting moments in a game video, which corresponds to the above-mentioned method for determining exciting moments in a game video. The corresponding technical features and technical effects are not described here again, for details, please refer to the above. FIG. 4 illustrates a block diagram of a device of determining exciting moments in a game video provided by Embodiment 3 of the present invention. As shown in FIG. 4, the device includes: a parsing module 301, an obtaining module 302, a recognizing module 303, a comparing module 304 and a determining module 305.

Wherein, the parsing module 301, capturing a video frame in a target game video; the obtaining module 302, obtaining an icon identifying a health point of a game character in the video frame; the recognizing module 303, recognizing the health point identified by the icon; the comparing module 304, determining a health point change of the game character by comparing the health point identified by the icon in a plurality of video frame; and the determining module 305, determining the exciting moments in the target game video according to the health point change.

According to an embodiment, the device further includes a judging module, determining whether the video frame is an in-game scene image, after the parsing module 301 captures the video frame in the target game video, and before the obtaining module 302 obtains the icon identifying the health point of the game character in the video frame. Wherein, when the video frame is an in-game scene image, the obtaining module 302 executes the step of obtaining an icon identifying a health point of a game character in the video frame.

According to an embodiment, the exciting moments comprise the video frame with the icon with zero health point.

According to an embodiment, when the determining module 305 determines the exciting moments in the target game video according to the health point change, the specific steps performed include: determining a first video frame, wherein the first video frame has an icon with the health point of a first game character which is any character in the game within a first preset health point range: determining a second video frame, wherein the second video frame is located behind the first video frame, and the second video frame has the icon with the health point of the first game character with zero health point: and determining the exciting moments comprising a plurality of video frames from the first video frame to the second video frame.

According to an embodiment, when the determining module 305 determines the exciting moments in the target game video according to the health point change, the specific steps performed include: determining a third video frame, wherein, the third video frame has the icon with the health point of a second game character within a second preset health point range and the icon with the health point of a third game character with non-zero health point, and the second game character and the third game character belongs to different teams in a game; determining a fourth video frame, wherein, the fourth video frame is located behind the third video frame, a time difference between the fourth video frame and the third video frame is less than a first preset time, and the fourth video frame has the icon with the health point of the third game character with zero health point; and determining the exciting moments comprising a plurality of video frames from the third video frame to the fourth video frame.

According to an embodiment, when the determining module 305 determines the exciting moments in the target game video according to the health point change, the specific steps performed include: determining a fifth video frame, wherein, the fifth video frame has an icon with the health point of the four game character with zero health point; determining a sixth video frame, wherein, the time difference between the sixth video frame and the fifth video frame is less than a second preset time, the sixth video frame has an icon with the health point of the fifth game character with zero health point, and the fifth game character and the sixth game character are different characters; and determining the exciting moments comprising a plurality of video frames from the fifth video frame to the sixth video frame.

According to an embodiment, the exciting moments includes a plurality of video frames in which the health point change is greater than a preset health point within a preset time.

According to an embodiment, when obtaining the icon identifying the health point of the game character in the video frame, the obtaining module 302 obtains pixels at a preset position in the video frame to obtain the icon.

According to an embodiment, when obtaining the icon identifying the health point of the game character in the video frame, the obtaining module 302 obtains pixels forming a preset outline in the video frame to obtain the icon.

Embodiment 4

Figure 5:
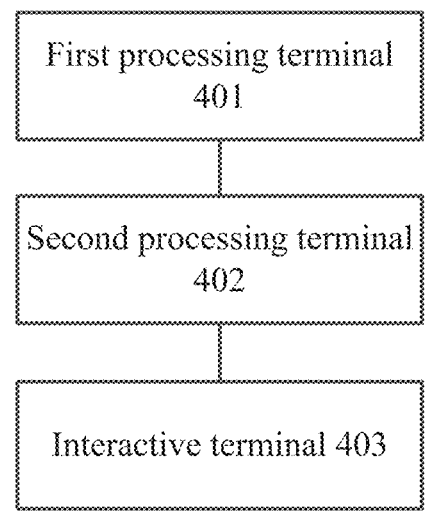
FIG. 5 illustrates a block diagram of a device of playing a game video provided by Embodiment 4 of the present invention.

Embodiment 4 of the present invention provides a device of playing a game video. The device corresponds to the method of playing the game video described above. The corresponding technical features and technical effects are not described here again. For details, refer to the above. FIG. 5 illustrates a block diagram of a device of playing a game video provided by Embodiment 4 of the present invention. As shown in FIG. 5, the device includes a first processing terminal 401, a second processing terminal 402, and an interactive terminal 403.

The first processing terminal 401 determines exciting moments in a target game video by using any of the above methods for determining the exciting moments in the game video. The second processing terminal 402 obtains parameters of the exciting moments from the first processing terminal 401, generates a displaying content according to the obtained parameters and sends the displaying content to the interactive terminal 403. The interactive terminal 403 plays the target game video and displays an entrance control on a playing interface to enter the exciting moments. The interactive terminal 403 also receives user's operation on the entrance control, and the second processing terminal 402 controls the interactive terminal 403 to skip a current playing progress to the exciting moments for playing in response to the user's operation on the entrance control.

Embodiment 5

Figure 6:
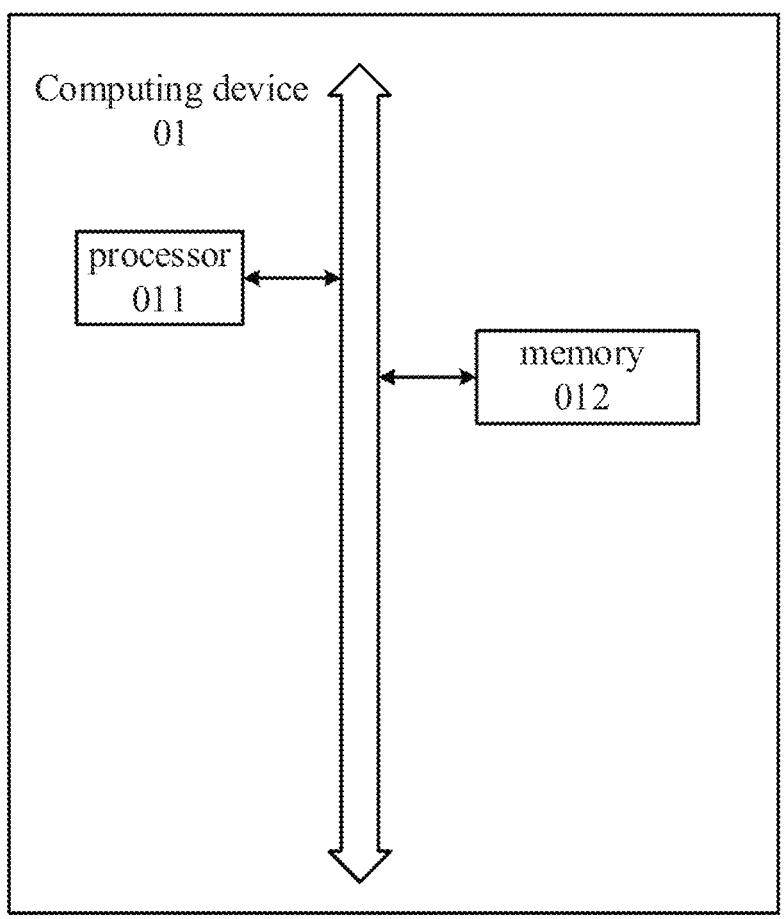
FIG. 6 illustrates a schematic diagram of hardware architecture of a computing device provided by Embodiment 5 of the present invention.

The Embodiment 5 of the present invention also provides a computing device, such as a smart phone, a tablet computer, a notebook computer, a desktop computer, a rack server, a blade server, a tower server, or a rack server (including a stand-alone server, or server cluster consisting of a plurality of servers), and so on. As shown in FIG. 6, the computing device 01 of the embodiment includes at least, but not limited to: a memory 011 and a processor 012 that can be communicatively connected to each other through a system bus. It should be noted that FIG. 6 only shows the computing device 01 having the components of the memory 011 and the processor 012, but it should be understood that not all components shown are required to be implemented, and more or fewer components may be implemented instead.

In the embodiment, the memory 011 (which is a readable storage medium) includes a flash memory, a hard disk, a multimedia card, a card-type memory (such as, SD or DX memory and so on), a random access memory (RAM), a static random access memory (SRAM), a read-only memory (ROM), an electrically erasable programmable read-only memory (EEPROM), a programmable read-only memory (PROM), magnetic memory, magnetic disks, optical disks and soon. In some embodiments, the memory 011 may be an internal storage unit of the computing device 01, such as a hard disk or a memory of the computing device 01. In other embodiments, the memory 011 may also be an external storage device of the computing device 01, such as a plug-in hard disk, a smart media card (SMC), and a Secure Digital (SD) card, a Flash Card and so on. Of course, the memory 011 may also include both the internal storage unit of the computing device 01 and its external storage device. In the embodiment, the memory 011 is generally used to store an operating system and various types of application software installed in the computing device 01, such as program codes of the device for determining exciting moments in game video. In addition, the memory 011 can also be used to temporarily store various types of data that have been output or will be output.

The processor 012 may be a Central Processing Unit (CPU), a controller, a microcontroller, a microprocessor, or other data processing chips in some embodiments. The processor 012 is generally used to control the overall operation of the computing device 01. In the embodiment, the processor 012 is used to run the program codes or process data stored in the memory 011, for example, a method for determining the exciting moments in a game video, a method for playing the game video and so on.

Embodiment 6

The Embodiment 6 further provides a computer-readable storage medium, such as a flash memory, a hard disk, a multimedia card, a card-type memory (for example, SD or DX memory and so on), a random access memory (RAM), a static random access memory (SRAM), a read-only memory (ROM), an electrically erasable programmable read-only memory (EEPROM), a programmable read-only memory (PROM), a magnetic memory, magnetic disks, optical disks, servers. App Store and so on, which stores computer program that upon execution by a processor cause the processor to implement the corresponding function. The computer-readable storage medium of the embodiment is used to store the device for determining a exciting moments in a game video, and when executed by the processor, the method for determining the exciting moments in the game video and the method for playing the game video of the embodiment are implemented.

It should be noted that, in this article, the terms "including", "comprising" or any other variants thereof are intended to cover non-exclusive inclusion, so that a process, method, article or device including a series of elements includes not only those elements, It also includes other elements not explicitly listed, or elements inherent to such a process, method, article, or device. Without more restrictions, an element limited by the sentence "including a . . . " does not exclude that there are other identical elements in the process, method, article, or device that includes the element.

The sequence numbers of the above embodiments of the present invention are for description only, and do not represent advantages and disadvantages of the embodiments.

Through descriptions of the above embodiments, those skilled in the art can clearly understand that the methods in the above embodiments can be implemented by means of software plus a necessary general hardware platform, and of course, can also be implemented by hardware, but in many cases the former is a better implementation.

The above are only preferred embodiments of the present invention and do not limit the patent scope of the present invention. Any equivalent structure or equivalent process transformation made by the description and drawings of the present invention, or directly or indirectly used in other related technical fields, are as same reason included in the scope of patent protection of present invention.

What is claimed is:

1. A method, comprising:
    capturing a video frame among a plurality of video frames in a target game video;
    obtaining an icon associated with a game character in the video frame;
    determining a corresponding health point of the game character in the video frame based on the icon;
    determining a health point change of the game character by comparing a plurality of health points of the game character in the plurality of video frames; and
    determining at least one exciting moment in the target game video based on the health point change.

2. The method of claim 1, further comprising:
    determining whether the video frame is an in-game scene image; and
    in response to a determination that the video frame is an in-game scene image, obtaining the icon associated with the game character in the video frame.

3. The method of claim 1, further comprising:
    determining that the at least one exciting moment comprises the vide frame based on determining that the corresponding health point of the game character is zero.

4. The method of claim 1, further comprising:
    identifying a first video frame, wherein the first video frame comprises a first icon indicative of a first health point of a first game character being within a first predetermined health point range;
    identifying a second video frame, wherein the second video frame is located behind the first video frame, and the second video frame comprises a second icon indicative of the second health point of the first game character being zero; and
    determining that the at least one exciting moment comprises a first set of video frames from the first video frame to the second video frame.

5. The method of claim 1, further comprising:
    identifying a third video frame, wherein the third video frame comprises a third icon indicative of a third health point of a second game character being within a second predetermined health point range and a fourth icon indicative of a fourth health point of a third game character being a non-zero health point, and wherein the second game character and the third game character belong to different teams of a game;
    identifying a fourth video frame, wherein the fourth video frame is located behind the third video frame, a time difference between the fourth video frame and the third video frame is less than a first predetermined time period, and the fourth video frame comprises a fifth icon indicative of a fifth health point of the third game character being zero; and
    determining that the at least one exciting moment comprises a second set of video frames from the third video frame to the fourth video frame.

6. The method of claim 1, further comprising:
    identifying a fifth video frame, wherein the fifth video frame comprises a fourth game character and a fifth game character whose health points are not zero;
    identifying a sixth video frame, wherein the sixth video frame comprises a sixth icon indicative of a sixth health point of the fourth game character being zero, a time difference between the fifth video frame and the sixth video frame is less than a second predetermined time period;
    identifying a seventh video frame, wherein the seventh video frame comprises a seventh icon indicative of a seventh health point of the fifth game character being zero, and wherein the seventh video frame is a same video frame as the sixth video frame or the seventh video frame is located between the fifth video frame and the sixth video frame; and
    determining that the at least one exciting moment comprises a third set of video frames from the fifth video frame to the sixth video frame.

7. The method of claim 1, wherein the obtaining an icon associated with a game character in the video frame further comprises obtaining pixels at a predetermined position in the video frame.

8. The method of claim 1, wherein the obtaining an icon associated with a game character in the video frame further comprises obtaining pixels that form a predetermined outline in the video frame.

9. The method of claim 1, further comprising:
    displaying a user interface element when playing the target game video, wherein the user interface element is associated with the at least one exciting moment; and
    in response to a selection of the user interface element, skipping a current playing progress and playing the at least one exciting moment.

10. A computing device, comprising:
    at least one processor; and at least one memory communicatively coupled to the at least one processor and storing instructions that upon execution by the at least one processor cause the computing device to:
capture a video frame among a plurality of video frames in a target game video;
obtain an icon associated with a game character in the video frame;
determine a corresponding health point of the game character in the video frame based on the icon;
determine a health point change of the game character by comparing a plurality of health points of the game character in the plurality of video frames; and
determine at least one exciting moment in the target game video based on the health point change.

11. The computing device of claim 10, the at least one memory further storing instructions that upon execution by the at least one processor cause the computing device to:
determine that the at least one exciting moment comprises the vide frame based on determining that the corresponding health point of the game character is zero.

12. The computing device of claim 10, the at least one memory further storing instructions that upon execution by the at least one processor cause the computing device to:
identify a first video frame, wherein the first video frame comprises a first icon indicative of a first health point of a first game character being within a first predetermined health point range;
identify a second video frame, wherein the second video frame is located behind the first video frame, and the second video frame comprises a second icon indicative of the second health point of the first game character being zero; and
determine that the at least one exciting moment comprises a first set of video frames from the first video frame to the second video frame.

13. The computing device of claim 10, the at least one memory further storing instructions that upon execution by the at least one processor cause the computing device to:
identify a third video frame, wherein the third video frame comprises a third icon indicative of a third health point of a second game character being within a second predetermined health point range and a fourth icon indicative of a fourth health point of a third game character being a non-zero health point, and wherein the second game character and the third game character belong to different teams of a game;
identify a fourth video frame, wherein the fourth video frame is located behind the third video frame, a time difference between the fourth video frame and the third video frame is less than a first predetermined time period, and the fourth video frame comprises a fifth icon indicative of a fifth health point of the third game character being zero; and
determine that the at least one exciting moment comprises a second set of video frames from the third video frame to the fourth video frame.

14. The computing device of claim 10, the at least one memory further storing instructions that upon execution by the at least one processor cause the computing device to:
identify a fifth video frame, wherein the fifth video frame comprises a fourth game character and a fifth game character whose health points are not zero;
identify a sixth video frame, wherein the sixth video frame comprises a sixth icon indicative of a sixth health point of the fourth game character being zero, a time difference between the fifth video frame and the sixth video frame is less than a second predetermined time period;
identify a seventh video frame, wherein the seventh video frame comprises a seventh icon indicative of a seventh health point of the fifth game character being zero, and wherein the seventh video frame is a same video frame as the sixth video frame or the seventh video frame is located between the fifth video frame and the sixth video frame; and
determine that the at least one exciting moment comprises a third set of video frames from the fifth video frame to the sixth video frame.

15. The computing device of claim 10, wherein the obtaining an icon associated with a game character in the video frame further comprises obtaining pixels at a predetermined position in the video frame.

16. The computing device of claim 10, wherein the obtaining an icon associated with a game character in the video frame further comprises obtaining pixels that form a predetermined outline in the video frame.

17. The computing device of claim 10, the at least one memory further storing instructions that upon execution by the at least one processor cause the computing device to:
display a user interface element when playing the target game video, wherein the user interface element is associated with the at least one exciting moment; and
in response to a selection of the user interface element, skip a current playing progress and play the at least one exciting moments.

18. A non-transitory computer-readable storage medium, storing computer-readable instructions that upon execution on a computing device cause the computing device at least to:
capture a video frame among a plurality of video frames in a target game video;
obtain an icon associated with a game character in the video frame;
determine a corresponding health point of the game character in the video frame based on the icon;
determine a health point change of the game character by comparing a plurality of health points of the game character in the plurality of video frames; and
determine at least one exciting moment in the target game video based on the health point change.

19. The non-transitory computer-readable storage medium of claim 18, further storing computer-readable instructions that upon execution on the computing device cause the computing device at least to:
identify a first video frame, wherein the first video frame comprises a first icon indicative of a first health point of a first game character being within a first predetermined health point range;
identify a second video frame, wherein the second video frame is located behind the first video frame, and the second video frame comprises a second icon indicative of the second health point of the first game character being zero; and
determine that the at least one exciting moment comprises a first set of video frames from the first video frame to the second video frame.

20. The non-transitory computer-readable storage medium of claim 18, further storing computer-readable instructions that upon execution on the computing device cause the computing device at least to:

display a user interface element when playing the target game video, wherein the user interface element is associated with the at least one exciting moment; and in response to a selection of the user interface element, skip a current playing progress and play the at least one exciting moments.

\* \* \* \* \*